(12) United States Patent
Ivanov et al.

(10) Patent No.: US 8,878,772 B2
(45) Date of Patent: Nov. 4, 2014

(54) METHOD AND SYSTEM FOR DISPLAYING IMAGES ON MOVEABLE DISPLAY DEVICES

(75) Inventors: Yuri Ivanov, Arlington, MA (US); John C. Barnwell, III, Leominster, MA (US); James Barabas, Roxbury, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 1372 days.

(21) Appl. No.: 12/545,408

(22) Filed: Aug. 21, 2009

(65) Prior Publication Data
US 2011/0043442 A1 Feb. 24, 2011

(51) Int. Cl.
G09G 5/00 (2006.01)
G09G 3/00 (2006.01)
G06F 1/16 (2006.01)
G09G 5/36 (2006.01)

(52) U.S. Cl.
CPC ........ *G09G 3/003* (2013.01); *G06F 2200/1637* (2013.01); *G09G 5/363* (2013.01); *G06F 1/1626* (2013.01)
USPC ................. 345/156; 361/679.05; 361/679.06; 361/679.07

(58) Field of Classification Search
None
See application file for complete search history.

(56) References Cited

U.S. PATENT DOCUMENTS

2006/0187215 A1* 8/2006 Rosenberg et al. ........... 345/173
2010/0174421 A1* 7/2010 Tsai et al. ..................... 700/302

FOREIGN PATENT DOCUMENTS

JP 20080305178 8/2008

* cited by examiner

*Primary Examiner* — Wayne Young
*Assistant Examiner* — Brian Butcher
(74) *Attorney, Agent, or Firm* — Dirk Brinkman; Gene Vinokur

(57) ABSTRACT

A display system includes a display device having multiple possible poses, including a neutral pose. A physical constraint maintains the display device in the neutral pose absent an application of an external force. A sensor measures a magnitude and direction of a displacement of the display device to a displaced pose due to the application of the external force. Then, the rendering engine renders an image on the display device according to the magnitude and direction of the displacement even while the display device remains constant in the displaced pose.

17 Claims, 10 Drawing Sheets

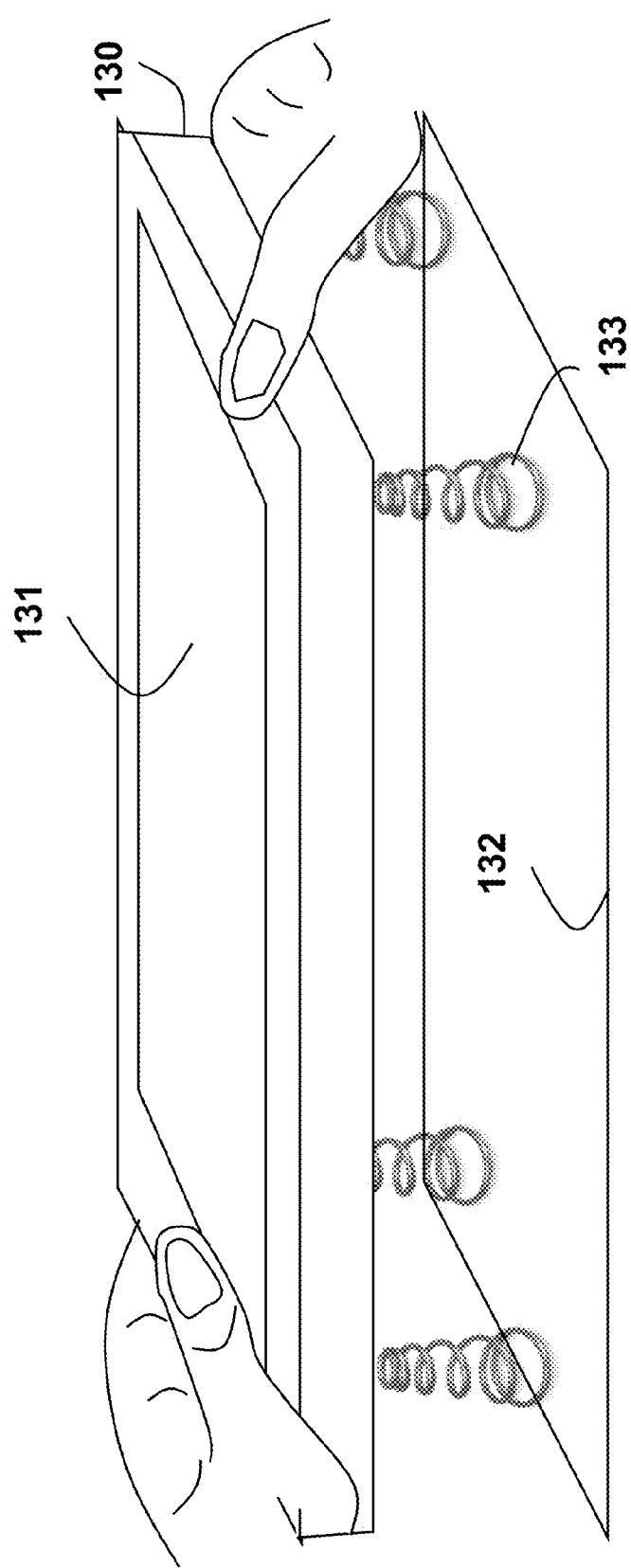

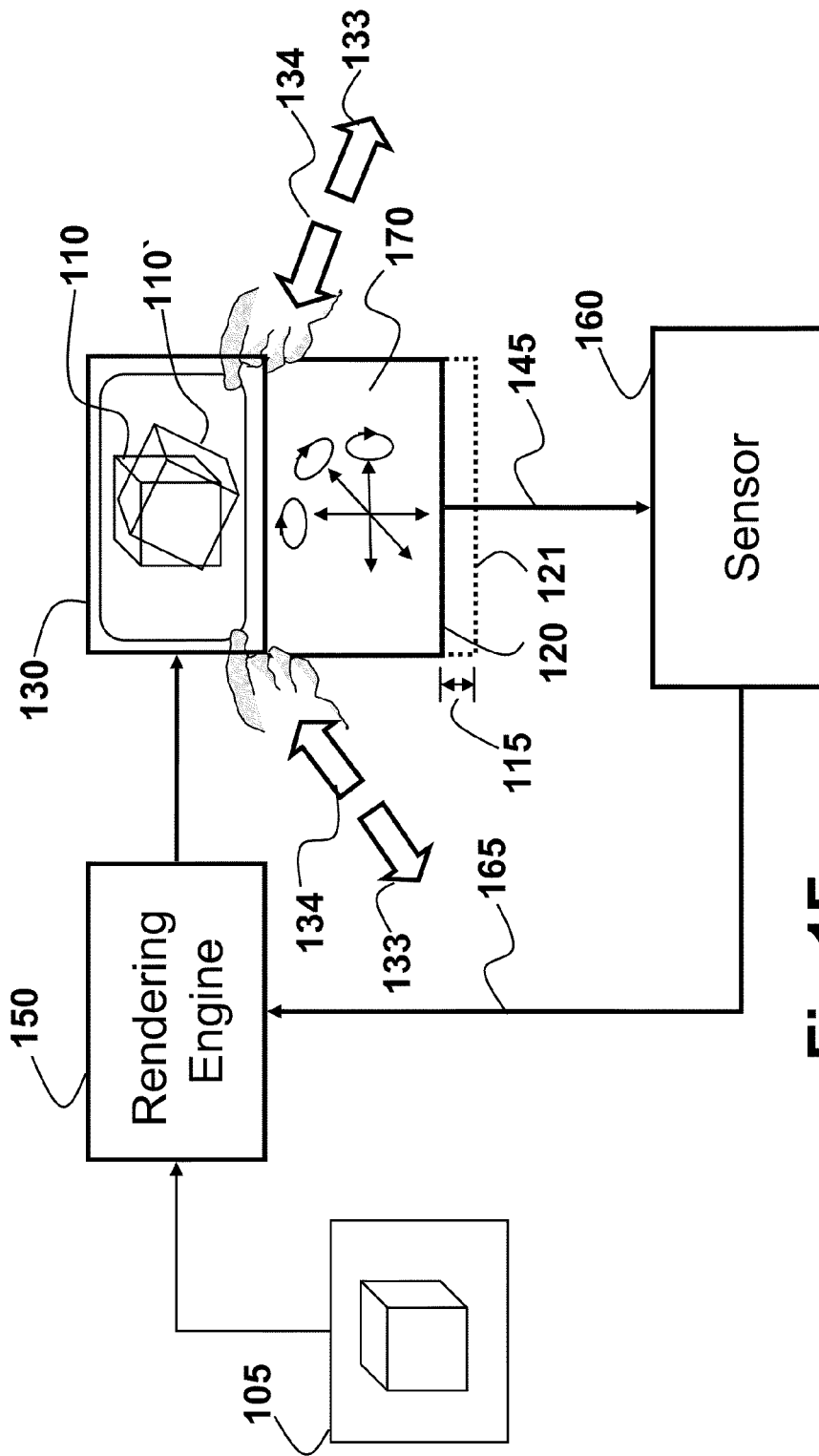

200

METHOD AND SYSTEM FOR DISPLAYING IMAGES ON MOVEABLE DISPLAY DEVICES

FIELD OF THE INVENTION

This invention relates generally to a method for displaying images on a display device, and more particularly to a method wherein the displaying of the images is controlled by manipulating and moving the display device.

BACKGROUND OF THE INVENTION

There are number of known methods that allow a user to select and control images and objects displayed on a display device. For example, in computer-aided design (CAD) applications, the 3D representation of the object can be translated, rotated, and scaled with a computer mouse. In response to movement of the mouse, computer software modifies the displayed image of the object. However, controlling the displayed objects using a mouse is not always convenient, intuitive, and precise.

First, the mouse moves in a plane of a work surface, while the image moves in a plane of the display screen, which is perpendicular to the plane of the mouse movement.

Second, to control the displayed object with six degrees of freedom (DOF), e.g., 3D for rotation and 3D for translation, several degrees of freedom need to be locked, while the remaining degrees of freedom are mapped to the degrees of freedom available for the input device.

Third, while the displayed image is controlled, the mouse is typically placed on a work surface. Thus, the plane of movement of the display is disjoint from the plane of the movement of the input device.

Fourth, the image moves only when the mouse moves. If the image has to be moved a large distance, the mouse quickly runs out of running room, falls of the mouse pad, or runs into obstacles, such as the display device stand, keyboard or other paraphernalia on the desk until the mouse is picked up and repositioned. This is a nuisance.

SUMMARY

A display system includes a display device having multiple possible poses, including a neutral pose. A physical constraint maintains the display device in the neutral pose absent an application of an external force.

A sensor measures a magnitude and direction of a displacement of the display device to a displaced pose due to the application of the external force.

Then, the rendering engine renders an image on the display device according to the magnitude and direction of the displacement even while the display device remains constant in the displaced pose.

BRIEF DESCRIPTION OF THE DRAWINGS

FIGS. 1A-1D are schematics of a display device according to embodiments of the invention;

FIG. 1F is a block diagram of a method and a system for manipulating a display device while displaying an image according to the embodiments of the invention;

DETAILED DESCRIPTION OF THE PREFERRED EMBODIMENT

Figure 1A:
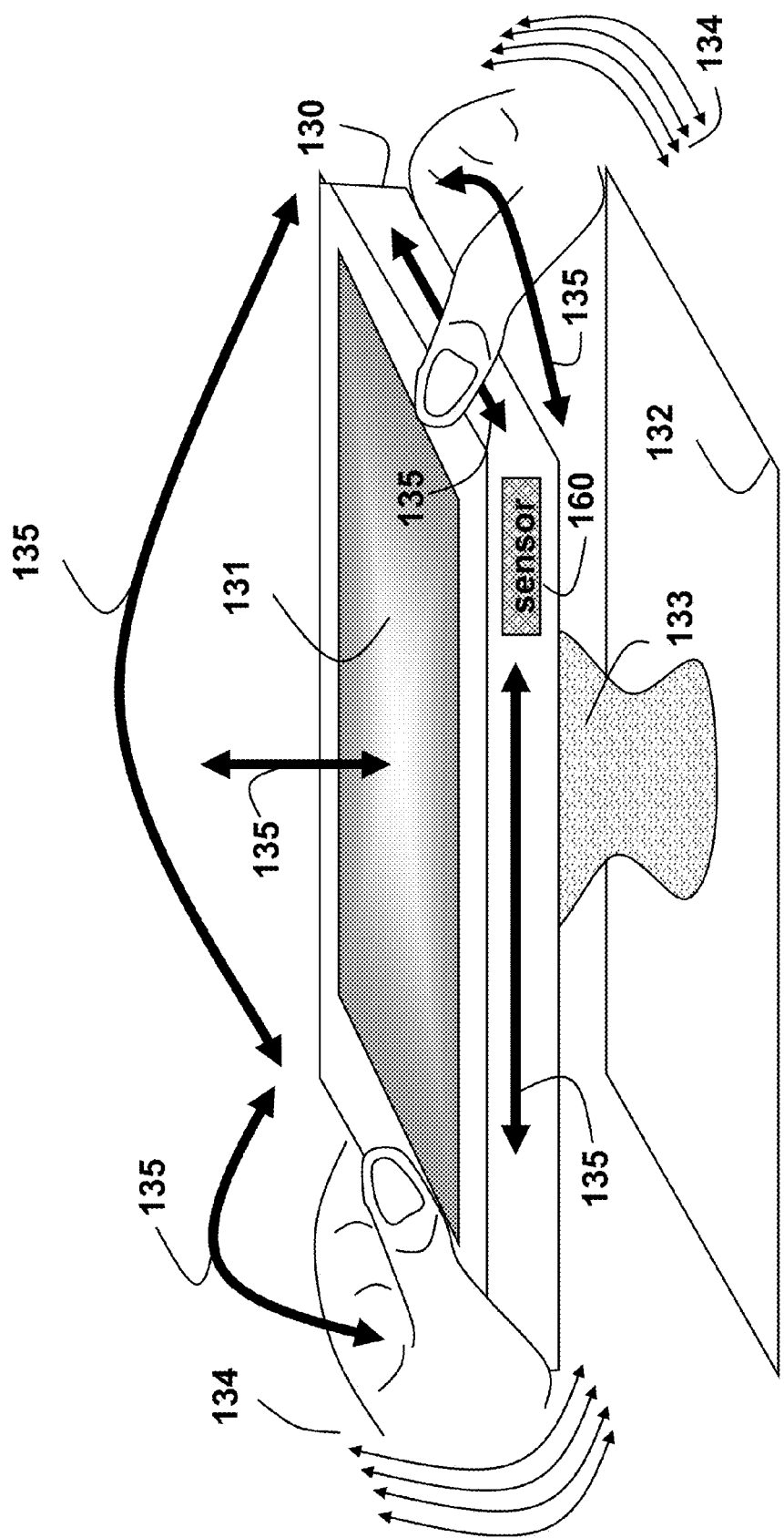

FIGS. 1A-1D show a display device 130 according to embodiments of the invention. The display device includes a display screen 131. The display device is movably connected to a base 132 by constraint means 133, such that the display device has multiple possible poses, i.e., the display device has six degrees of freedom as indicated by arrows 135. Absent an application of an external force, the display device has a neutral pose, which is, for example, centered on the constraint means, and coplanar to the base.

When external forces 134 are applied to the display device, e.g., by hands of a user, the display device is displaced from the neutral pose to a displaced pose, i.e., any pose that is not the neutral pose. When the forces are removed, the constraint means returns and maintains the display device in the neutral pose.

The display device also includes a sensor 160 to measure the displacement or pose of the display device. The displacement is used to determine viewing parameters for rendering an image on the display screen 131. Conventionally, the viewing parameters are associated with a viewpoint of a virtual camera pose used to render images. For example, if the display device is moved side to side, the image also moves side to side. Rotating the display device will similarly tilt or rotate the image. Moving the display device up or down (perpendicular to the base) causes the image to be scaled to simulate a zooming effect. The various possible displacements can be combined while rendering images.

Figure 1B:
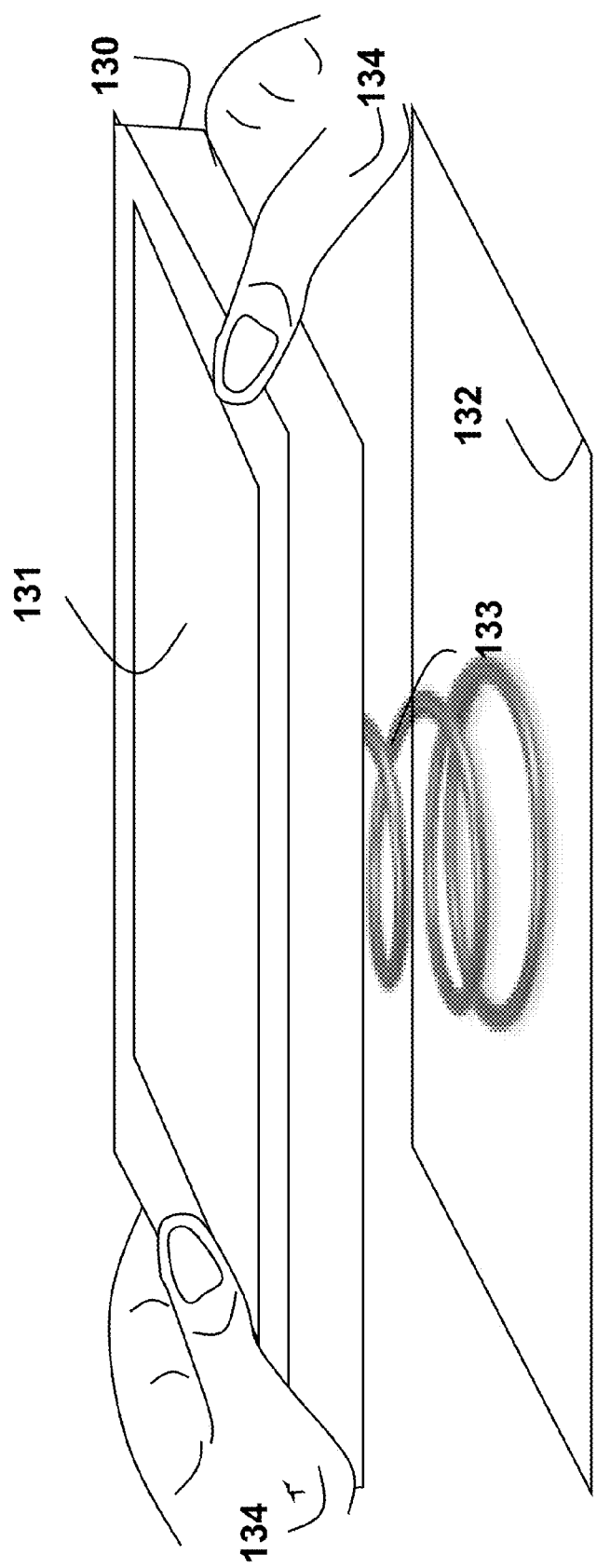
Figure 1D:
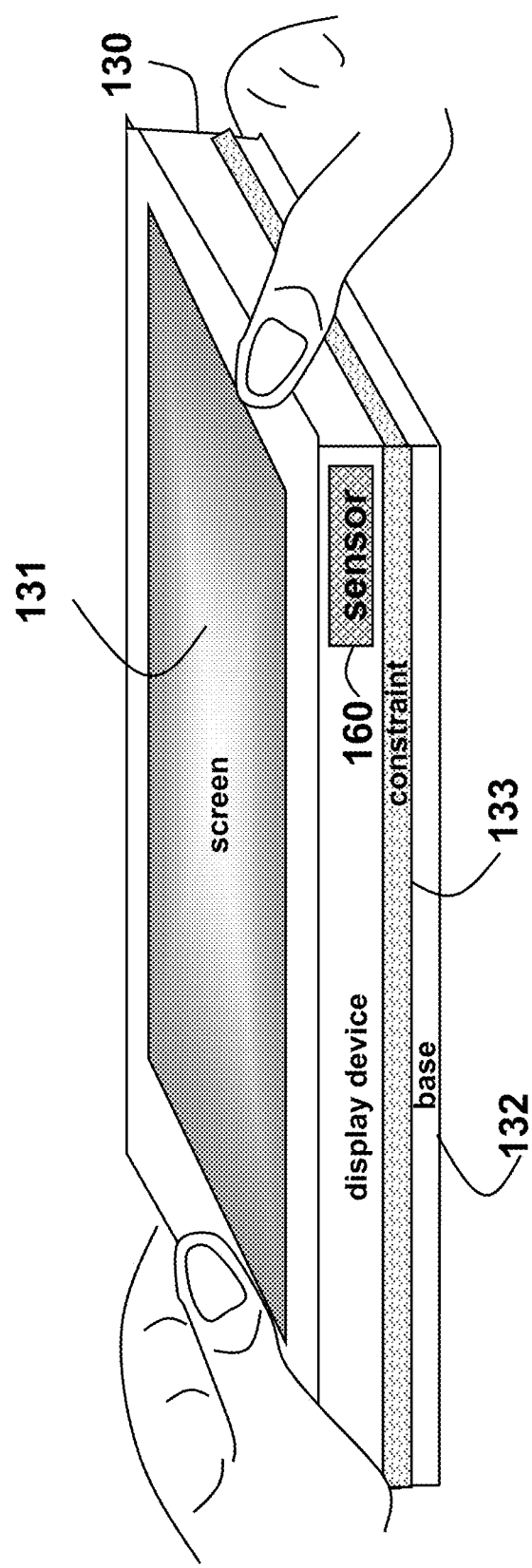
Figure 1E:
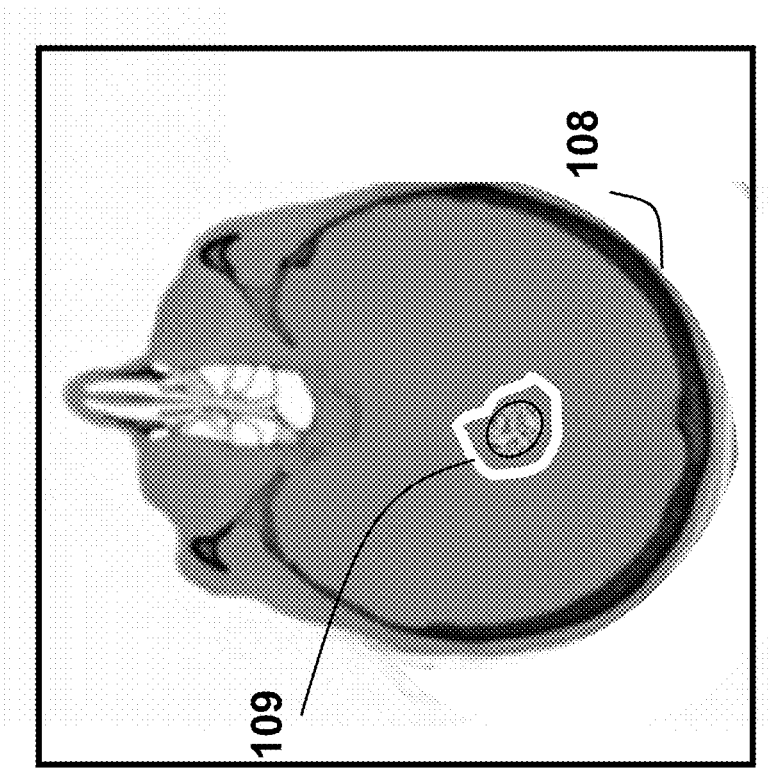
FIG. 1E is an example of rendering volumetric data on the display device of FIGS. 1A-1D.

As shown in FIG. 1E, the device is particularly useful for rendering volumetric data, such as 3D medical or geological scans. In this case, movement of the display device causes a similar movement in the displayed volume. Using the zooming feature, a slice 108 through the volume can be selected at an appropriate depth, and marked 109 to note interesting features, e.g. a tumor. The marking can be done by using a touch sensitive screen. The device can also be used with 3D geographic information systems (GIS).

The constraint means has some interesting properties not found in conventional computer input devices.

If the display device is displaced from the neutral pose to some other pose, force is required to maintain the display device in that displaced pose.

Hence, even while the displaced pose of the display remains constant, the image continues to move according to the magnitude and direction the applied force necessary to maintain the display device in that displaced pose.

This is in sharp contrast with a mouse driven display, where the display stops moving the instant the mouse stops. Also, the mouse does not return to a neutral pose when the hand is removed. Instead, the mouse is just left stranded at its last location. Continuously moving the image a long way is not possible with a mouse because the mouse will inevitably run out of room on the work surface.

As shown in FIG. 1A, the constraint means 133 is made of an elastomer, e.g., Ultraflex®. Alternatively, as shown in FIGS. 1B-1C, the constraint means can be one or more springs. FIG. 1D shows a compact, portable version of the display device.

FIG. 1F shows a method and a system 100 for displaying an image 110 on the screen 131 of the display device 130. The display device is manipulated by hands of the user, which forces 134. In one embodiment, the display device is arranged in the neutral pose 120 on a manipulator 170 having six degrees of freedom (6-DOF). Accordingly, the display device can be manipulated by the user with 6-DOF. However, other arrangements having different degrees of freedom are also possible.

Such arrangement allows positioning the display device to multiple possible poses including the neutral pose 120 and a displaced pose 121. The display device is configured to be positioned to the displaced pose by the application of the external force 134.

During operation the image 110 is displayed on the display screen using viewing parameters of a virtual camera. The viewing parameters are proportional to a direction, magnitude and a time of the displacement of the display device from the neutral pose.

The user manipulates the display device by applying the external force 134 to the display device. The force displaces the device from the neutral pose to a displaced pose forming the displacement 115. For example, in some embodiments, the user manipulates the display device by rotating and/or translating the device. Accordingly, the system 100 includes the constraint means 133 configured to return and maintain the display device in the neutral pose when the force 134 is removed.

The force 134 is characterized by one or more parameters such as, but not limited to, a magnitude, direction and a time of the application of the force. Typically, the displacement is proportional to the direction and the magnitude of the force. The force can be divided on components of the force, i.e., one component for each degree of freedom. Each component is also characterized by the parameters. The parameters characterizing one component are independent of the parameters characterizing another component of the force.

The system 100 includes a sensor 160 configured to sense 145 the displacement 115 of the display device. In various embodiments, the sensor can sense the forces directly or indirectly, e.g., senses a force applied to the manipulator by the display device.

The sensor generates a signal 165, e.g., an electrical signal, indicative of the displacement. In various embodiments of the invention, a value of the signal 165 is proportional to the external force. For example, in some embodiments, the sensor 160 measures the displacement 115 and generates the signal 165 proportional to the direction and magnitude of the displacement.

A rendering engine 150 is connected to the sensor 160 and the display device 130. Based on the signal 165, the rendering engine displays the image 110' based on viewing parameters of a virtual camera. As described below, the rendering engine updates the image 110, i.e., generates and displays an image 110', based on the digital representation of a scene 105, as viewed from a virtual viewing point by the virtual camera, wherein the virtual viewing point is based on the signal 165. The rendering engine continues to generate and display the image 110' while the signal 165 is generated by the sensor, i.e., while the force 134 is applied by the user and/or while the displacement 115 exists.

Figure 2:
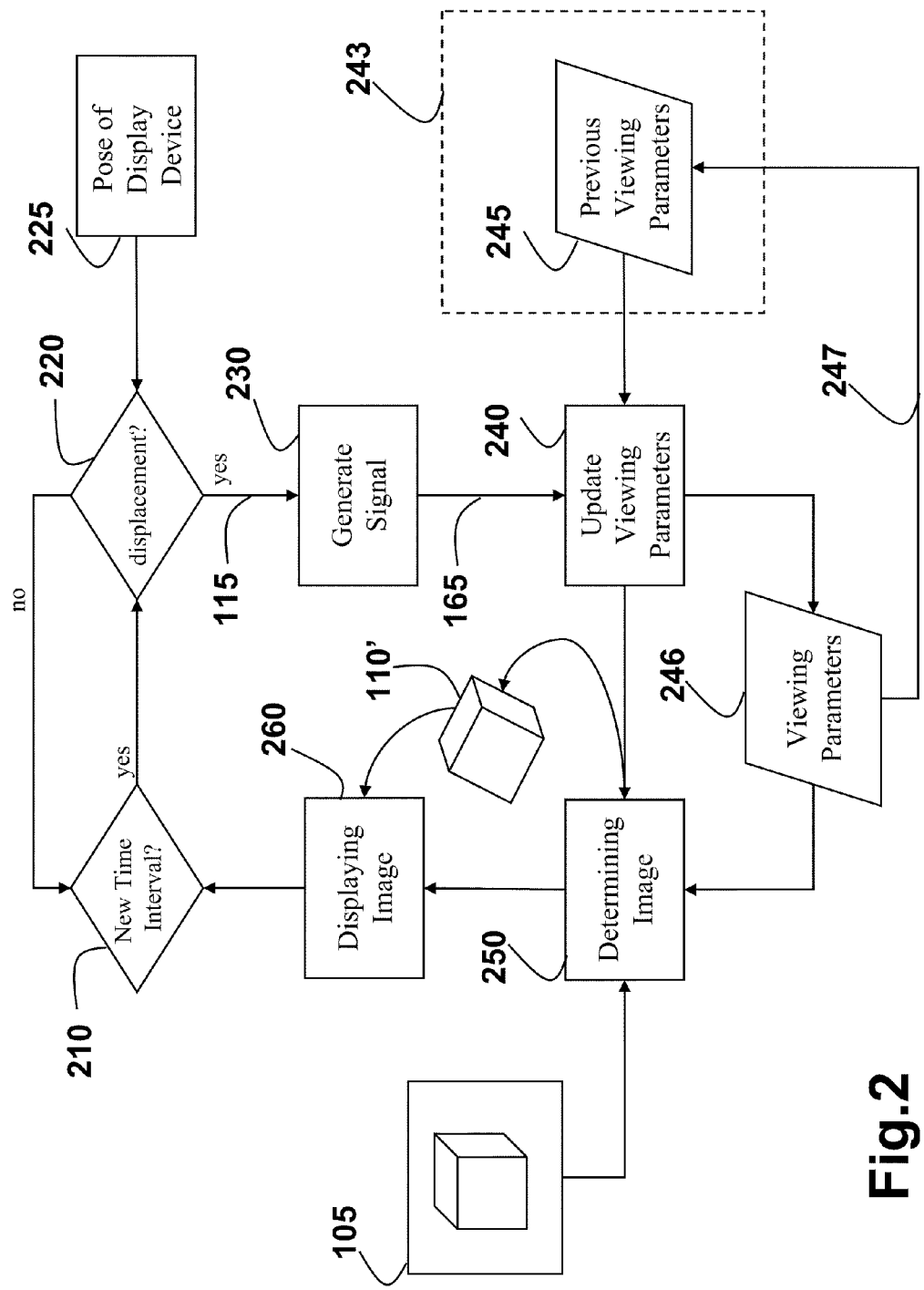
FIG. 2 is a block diagram of a method for updating and displaying an image according to the embodiments of the invention.

FIG. 2 shows a method 200 for displaying the image 110' on the display device. The method can be implemented in a processor including memory and input/output interfaces as known in the art. The displacement 115 is periodically determined 220 at time intervals αt 210. The pose 225 of the display is defined by the displacement. If the displacement exists, the signal 165 is generated 230 such that the signal 165 indicates the magnitude and the direction of the displacement. Based on the signal 165, the viewing parameters 245 are updated 240 producing viewing parameters 246. At the next time interval 210, the viewing parameters 246 replace 247 the previous viewing parameters 245 and are stored in a memory 243. The rendering engine 150 determines 250 the image 110' based on the current viewing parameters and the digital representation of the image 105 and displays 260 the image 110' on the screen of the display device. The steps of the method 200 are repeated for each new time interval 210.

As described above, the displacement of the display device causes the image 110' to be rendered without an additional change of the pose of the display device. Thus, for example, in order to move a virtual object displayed on the display device in one direction, the user applies force to displace the device in that direction, and wait when the desired destination is reached.

Sensor

The sensor 160 senses the external force applied to the display device and generates a signal indicative of the force. Embodiments of the invention can use variety of sensing devices and techniques, such strain gauges, thin film sensors, optical, piezo-electric, inertial, semiconductor, and magnetorestictive sensors.

Figure 3:
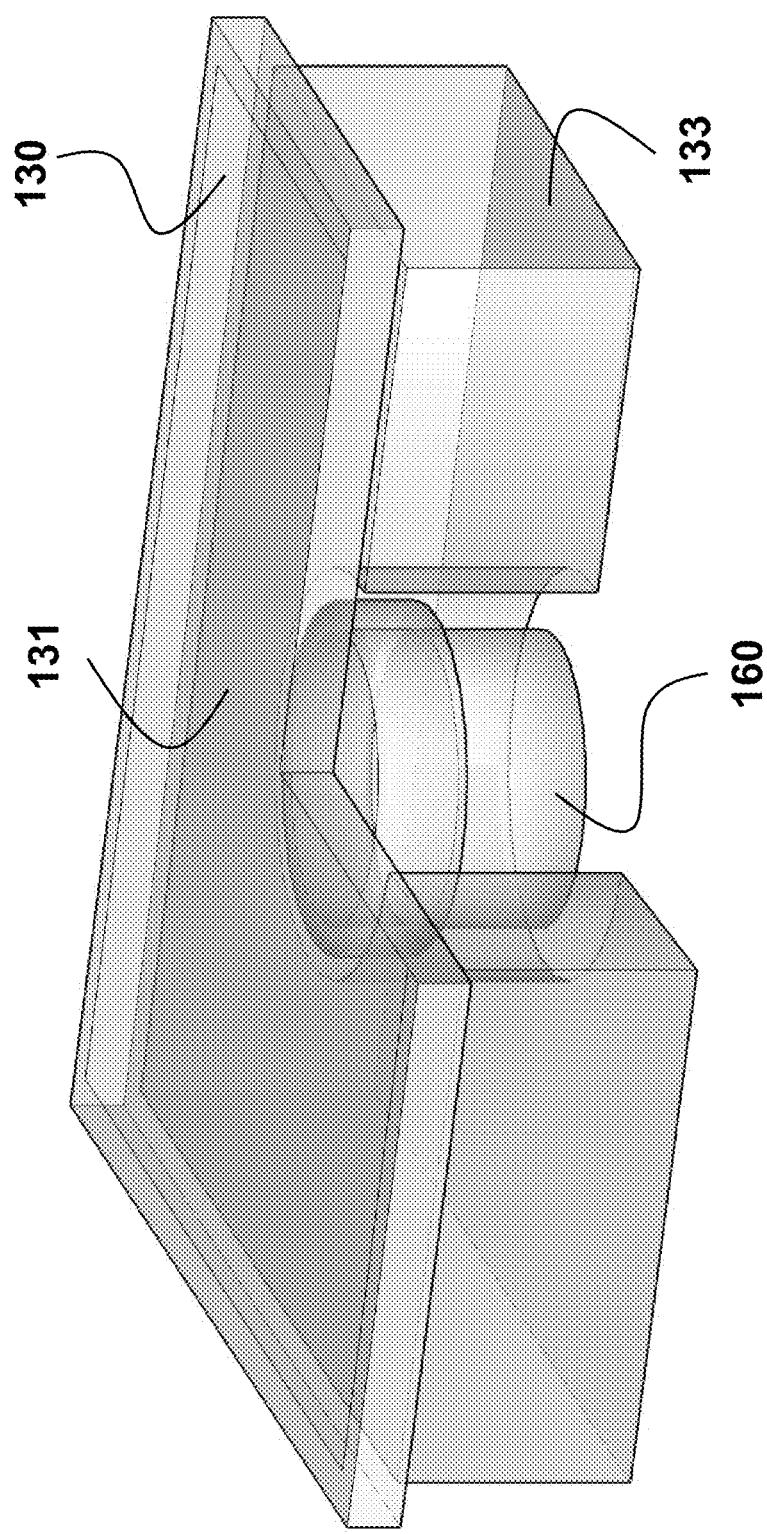
FIG. 3 is a schematic partially cut-away view of a differential display device according to the embodiments of the invention.

FIG. 3 shows an example of an embodiment of the invention. The display device 130 is mounted on a 6-DOF computer input device 310 such that the displacement of the display device causes the computer input device to generate the signal 165. The signal is used by the rendering engine to display the image on the display device. In variations of this embodiment, the rendering engine is either integrated with the input device and/or the display device, or implemented undependably. An example of the sensor 160 is a 6-DOF manipulator similar to SpaceNavigator™.

Rendering Engine

Figure 4:
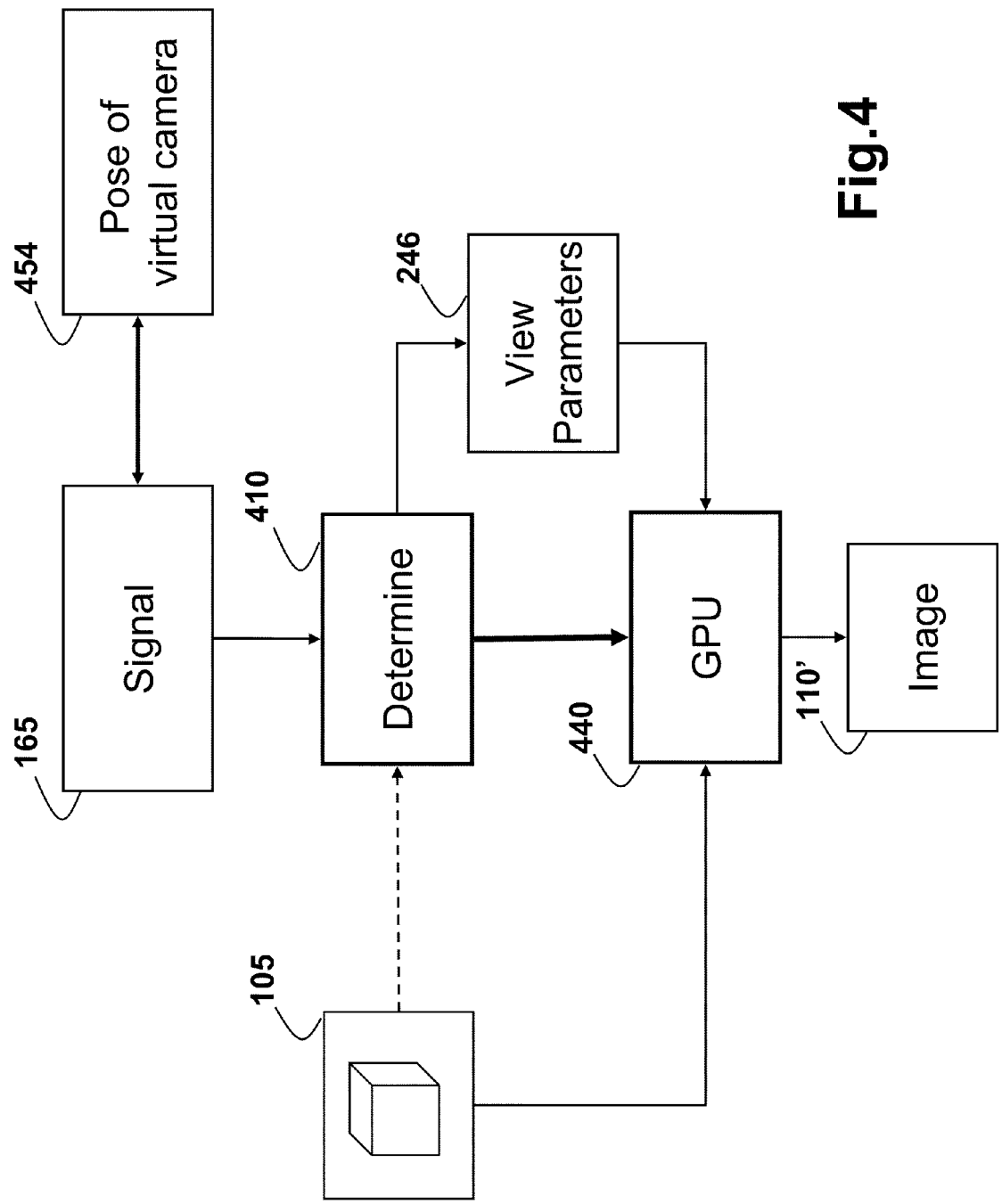
FIG. 4 is a block diagram of a method for displaying and updating a digital representation according to the embodiments of the invention.

FIG. 4 shows a method for displaying the image of the scene 110' on the display device. In response to the signal 165 indicative of the displacement of the display device, the method determines 410 viewing parameters 246 of a virtual camera 354. The viewing parameters 246 are proportional to the magnitude, the direction and the time of the displacement of the display device from the neutral pose. Based on the viewing parameters and the digital representation of the image 105, a graphic processing unit (GPU) 440 displays the image 110'.

Figure 5:
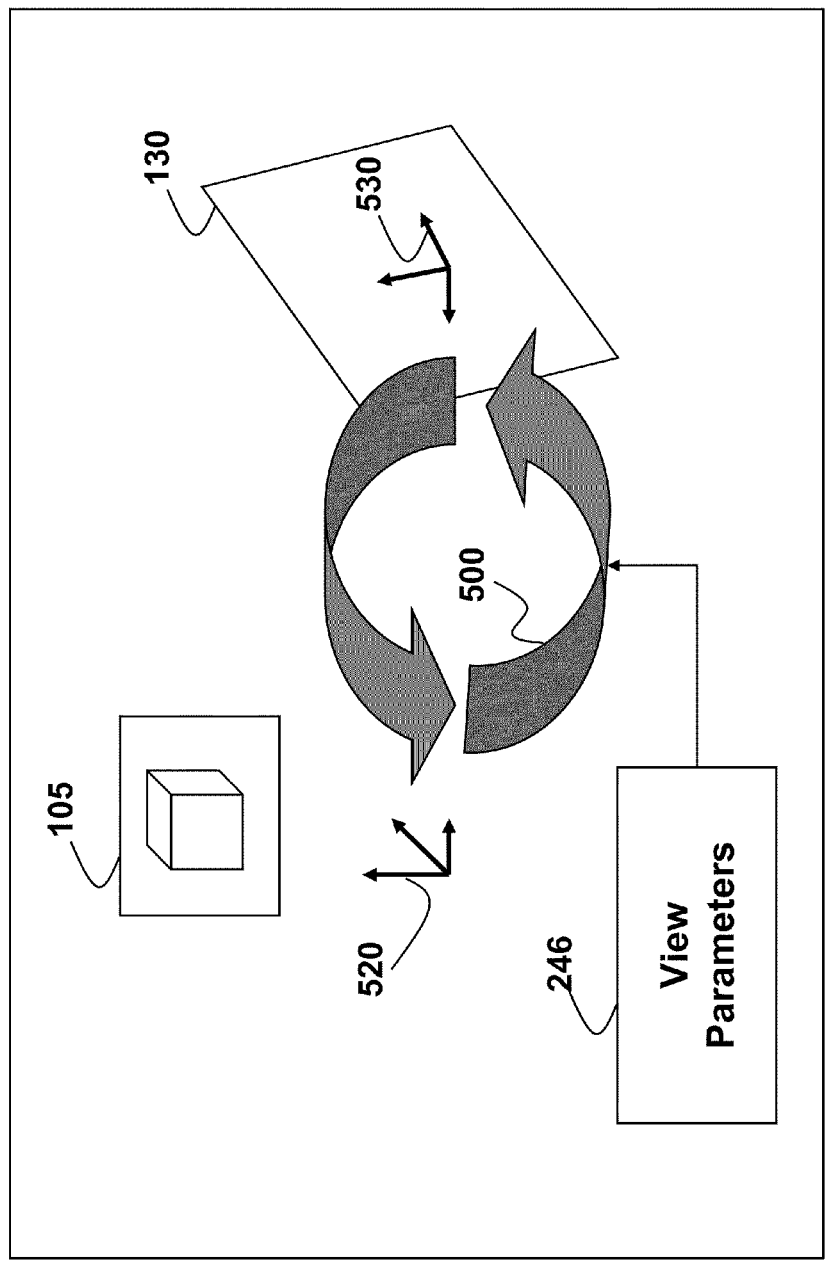
FIG. 5 is a block diagram of a method for coordinate transformations according to the embodiments of the invention.

FIG. 5 shows coordinate transformations 500 used by the rendering engine 150. The digital representation of the image 105 has a coordinate system 520 usually associated with one of the corners of the digital representation. The display device 130 is associated with a coordinate system 530. The viewing parameters 246 relate the coordinate system of the digital representation to the coordinate system of the display device.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A display system, comprising:
    a display device having a plurality of possible poses including a neutral pose; wherein the display device comprises a screen which is substantially planar and is not deformable by an external force;
    a constraint configured to maintain the display device in the neutral pose absent an application of the external force and return the display device to the neutral pose after the external force is removed; wherein the constraint allows at least substantial movement of the display device from the neutral pose to a different pose having the screen parallel to the screen position in the neutral pose and said different pose includes the screen in a plane that is a different plane than a plane of the screen in the neutral pose;
    a sensor configured to measure a magnitude and direction of a displacement of the display device from the neutral pose to a displaced pose due to the application of the external force; and
    a rendering engine for updating an image on the display device according to the magnitude and direction of the displacement while the display device remains constant in the displaced pose.

2. The system of claim 1, wherein the plurality of poses have six degrees of freedom.

3. The system of claim 1, wherein the constraint is constructed of an elastomer.

4. The system of claim 1, wherein the constraint includes one or more springs.

5. The system of claim 1, further comprising: a base connected to the display device by the constraint.

6. The system of claim 1, wherein the neutral pose is centered on the constraint, and coplanar to the base.

7. The system of claim 1, further comprising:
    determining viewing parameters for the rendering engine.

8. The system of claim 1, wherein the external force must be applied to the display device to maintain the displaced pose.

9. The system of claim 1, wherein the image moves continuously while in the displaced pose.

10. The system of claim 1, wherein the external force is applied by hands of a user.

11. The system of claim 7, wherein the viewing parameters are associated with a viewpoint of a virtual camera pose used to render the image.

12. The system of claim 1, wherein the sensor uses optical sensing.

13. The system of claim 1, wherein the sensor uses mechanical sensing.

14. The system of claim 1, wherein the image represents volumetric data.

15. The method of claim 14, wherein the displacement selects a slice of the volumetric data.

16. The method of claim 15, further comprising:
    means for marking the slice.

17. A method for rending an image on a display device, comprising a processor for performing steps of the method, comprising the steps of:
    providing a display device having a plurality of possible poses including a neutral pose;
    providing the display device with a screen which is substantially planar and is not deformable by an external force;
    providing a constraint;
    constraining the display device to the neutral pose absent an application of the external force;
    constraining the display device to return to the neutral pose after the external force is removed;
    constraining the display device to allow at least substantial movement of the display device from the neutral pose to a different pose having the screen parallel to the screen position of the neutral pose and said different pose includes the screen in a plane that is a different plane than a plane of the screen in the neutral pose;
    providing a sensor;
    sensing a magnitude and direction of a displacement of the display device with the sensor from the neutral pose to a displaced pose due to the application of the external force; and
    updating an image on the display device according to the magnitude and direction of the displacement while the display device remains constant in the displaced pose.

* * * * *